United States Patent [19]

Arno et al.

[11] Patent Number: 5,062,571
[45] Date of Patent: Nov. 5, 1991

[54] TEMPERATURE SENSING CONTROL FOR REFRIGERATION SYSTEM

[75] Inventors: Raymond P. Arno, Amherst; Scott C. Carnes, Buffalo, both of N.Y.

[73] Assignee: Rayco Enterprises, Inc., Buffalo, N.Y.

[21] Appl. No.: 662,961

[22] Filed: Mar. 1, 1991

Related U.S. Application Data

[60] Division of Ser. No. 652,309, Feb. 6, 1991, which is a continuation-in-part of Ser. No. 490,340, Mar. 8, 1990, abandoned.

[51] Int. Cl.[5] .............................................. G01K 1/08
[52] U.S. Cl. .............................. 236/43 A; 236/99 S; 374/148
[58] Field of Search ................. 236/99 S, 99 R, 93 A, 236/DIG. 7, 78 B; 374/148, 201; 62/201

[56] References Cited

U.S. PATENT DOCUMENTS

| 1,902,784 | 3/1933 | Larkin | 374/148 |
| 3,382,717 | 5/1968 | Keppel et al. | 374/148 |
| 3,526,134 | 9/1970 | Paine | 374/148 |

Primary Examiner—William E. Wayner
Attorney, Agent, or Firm—Joseph P. Gastel

[57] ABSTRACT

A sensing element for controlling the unloading of a compressor including a finned tube for placement in firm heat conducting engagement within a tube of a shell evaporator and containing a thermocouple which senses either the temperature of fluid within the tube or the temperature of the refrigerant on the outside of the tube which is located within the evaporator, depending on the amount of fluid flowing through the tube.

2 Claims, 2 Drawing Sheets

TEMPERATURE SENSING CONTROL FOR REFRIGERATION SYSTEM

CROSS REFERENCE TO RELATED APPLICATION

This application is a division of application Ser. No. 652,309, filed Feb. 6, 1991, which is a continuation-in-part of application Ser. No. 490,340, filed Mar. 8, 1990, now abandoned.

BACKGROUND OF THE INVENTION

The present invention relates to an improved refrigeration system which maintains a shell evaporator in a fully flooded condition and which unloads a hermetic compressor and which utilizes a novel control element for unloading the hermetic compressor.

By way of background, in the past in applications where a fully flooded evaporator was required, it was necessary to use certain structure such as surge drums, recirculating systems, floats, oil return piping, and oil separators. These components complicated the system in addition to adding costs thereto. Also, in the past, there were various ways of unloading a hermetic compressor when refrigeration was not required, and such methods included cycling the compressor on and off and by bypassing compressor discharge refrigerant directly into the suction line. Thus hermetic compressors were controlled in the past either by cycling the compressor on and off in response to demand or providing an artificial load with a discharge bypass valve equal to the difference between the real load and the systems capacity. Other methods included the use of pressure regulators and liquid or suction line solenoid valves controlled with thermostats. However, the various prior systems were undesirable in that they either constituted a waste of power or did not provide precise control or they involved the risk of oil starvation to the compressor.

SUMMARY OF THE INVENTION

It is one object of the present invention to provide an improved simple system for operating a shell evaporator in a fully flooded condition to insure the carrying of oil with the refrigerant from the shell evaporator to the compressor and to also insure the vaporization of liquid refrigerant emanating from the shell evaporator so as to prevent passage of liquid refrigerant to the compressor through the suction line.

It is another object of the present invention to provide an improved system for unloading a hermetic compressor while permitting it to continue to run without wasting excess power and without involving the risk of oil starvation to the compressor.

A further object of the present invention is to provide an improved control structure for unloading the compressor as required in response to the demand for refrigeration. Other objects and attendant advantages of the present invention will readily be perceived hereafter.

The present invention relates to a refrigeration system comprising a compressor, a condenser, first conduit means coupling said compressor to said condenser, a shell evaporator, second conduit means coupling said condenser to said shell evaporator, thermal expansion valve means in said second conduit means, third conduit means coupling said shell evaporator to said compressor, refrigerant and oil circulated through said system by said compressor, control means operatively associated with said third conduit means for controlling said thermal expansion valve, and heating means for heating said third conduit means between said shell evaporator and said control means to cause the heating of refrigerant therein to cause said control means to cause said thermal expansion valve to admit greater amounts of refrigerant to said shell evaporator than if heated refrigerant was not sensed by said control means to thereby cause said shell evaporator to operate in a flooded condition and thus cause a mixture of liquid refrigerant and oil to flow into said third conduit means from said shell evaporator, said heating means causing complete vaporization of said liquid refrigerant in said third conduit means to insure passage of a mixture of oil and gaseous refrigerant to said compressor.

The present invention also relates to a refrigeration system comprising a hermetic compressor having a compressor inlet, a condenser, first conduit means coupling said hermetic compressor to said condenser, an evaporator having an inlet and an outlet, second conduit means coupling said condenser to said evaporator, refrigerant expansion means in said second conduit means, third conduit means coupling said evaporator to said inlet of said hermetic compressor, refrigerant and oil circulated through said system by said compressor, and unloading means for unloading said hermetic compressor without overheating while permitting it to continue running, said unloading means comprising fourth conduit means coupled between said first conduit means and said compressor inlet for passing hot gas from said hermetic compressor directly back to said hermetic compressor, and fifth conduit means coupled from said first conduit means to at least one of said inlet and outlet of said evaporator to cause hot gas from said first conduit means to be cooled after passage from said fifth conduit means to thereby cool said hot gas passing into said compressor inlet from said fourth conduit means, and control means for selectively effecting passage of gases from said compressor through said fourth and fifth conduit means in response to the necessity for unloading said compressor to cause said refrigeration system to stop producing refrigeration.

The present invention also relates to a temperature sensing control for placement in a conduit having an internal surface through which fluid passes and having an external surface subject to the temperature of the medium in which it is located comprising a finned tube having a central tubular portion, fin means extending outwardly from said central tubular portion, outer edge means on said fin means in firm heat conducting contact with said internal surface, and a control member located within said central tubular portion and in firm heat conducting contact therewith to thereby substantially sense the temperature of said fluid passing through said fluid passing conduit when said flow dominates the effect of said medium to which the external surface of said fluid passing conduit is subjected and to substantially sense the temperature of said medium when the latter dominates the temperature of said fluid passing through said fluid passing conduit.

The various aspects of the present invention will be more fully understood when the following portions of the specification are read in conjunction with the accompanying drawings wherein:

DESCRIPTION OF THE PREFERRED EMBODIMENTS

Figure 1:
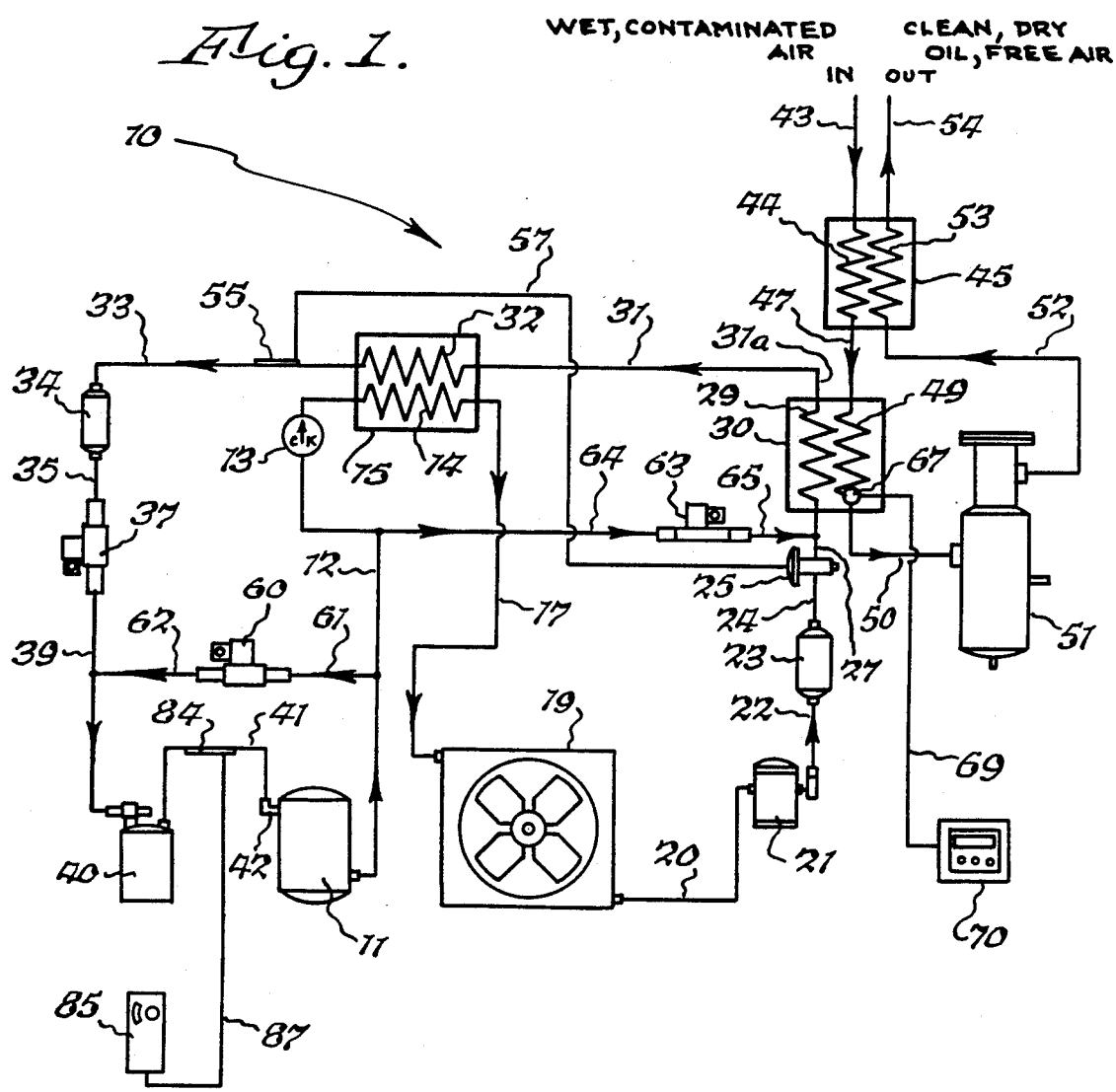
FIG. 1 is a schematic view of a refrigeration system for an air drier containing structure for maintaining a shell evaporator fully flooded and for unloading the compressor while permitting it to run when the air which is being dried is below a predetermined temperature.

By way of brief background, the refrigeration system of the present invention is intended to be used with an air drier, but it has other uses also. There are three major aspects to the present invention. The first aspect is to provide an arrangement for causing a shell evaporator to operate in fully flooded condition to thereby insure the passage of liquid refrigerant and entrained oil therefrom and also insuring that the liquid refrigerant is fully vaporized prior to entry into the compressor to thereby prevent what is known as "slugging" or "floodback." The second major aspect of the present invention is to provide an arrangement for unloading a hermetic compressor of a refrigeration system while permitting it to continue to run, thereby obviating the necessity for cycling the compressor in response to load or using other unloading procedures. The third aspect is to provide a novel control arrangement for controlling the unloading of a hermetic compressor.

The improved refrigeration system 10 of the present invention includes a hermetic compressor 11 for compressing a halocarbon refrigerant and passing it with entrained oil into conduit 12 through check valve 13, heat exchange conduit 14 of control evaporator 15, and conduit 17 to condenser 19 wherein the refrigerant is condensed in the conventional manner. The function of control evaporator 15 will be described at an appropriate point hereafter. Conduit 12, check valve 13, conduit 14, and conduit 17 are to be collectively considered as the conduit between the compressor 11 and condenser 19.

Figure 3:
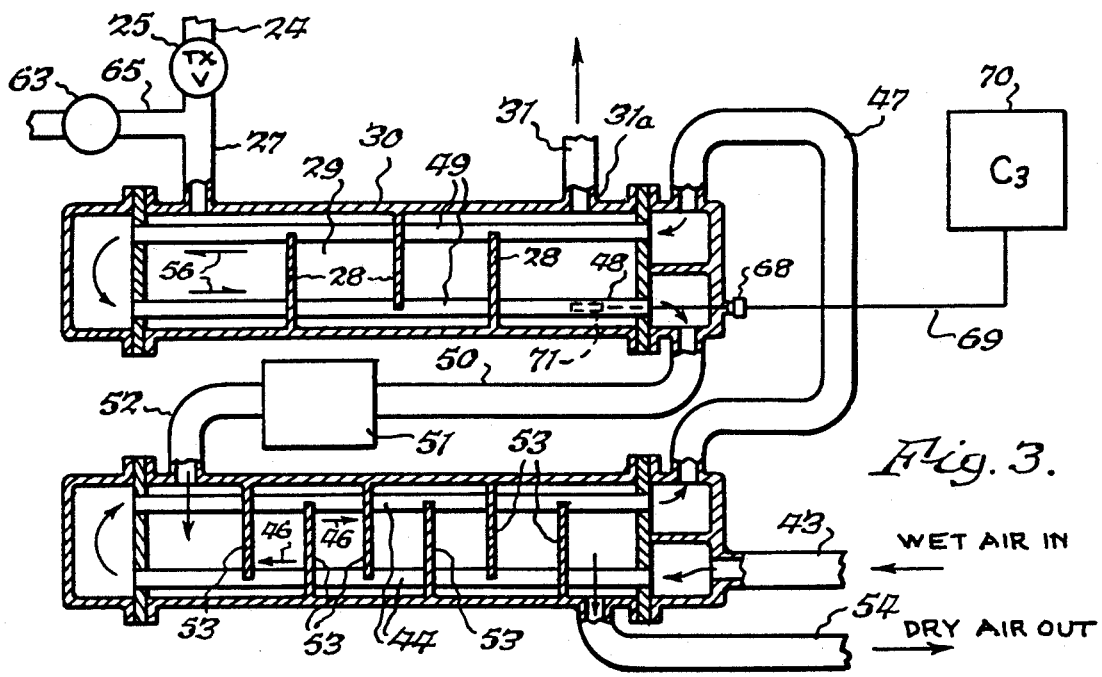
FIG. 3 is a fragmentary schematic view of a flooded evaporator used with an air drier and showing various components of FIGS. 1 and 2 thereon.
Figure 4:
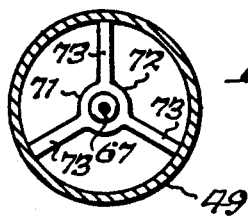
FIG. 4 is a cross sectional view taken substantially along line 4—4 of FIG. 3 and showing the combined plug and thermocouple structure for controlling the compressor unloading structure of FIGS. 1 and 2.
Figure 5:
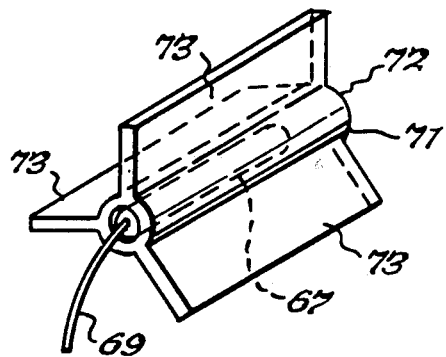
FIG. 5 is a fragmentary perspective view of the plug with the thermocouple therein.

The liquified refrigerant with entrained oil therein leaving condenser 19 passes into conduit 20 and then into receiver 21 from which it passes into conduit 22 and then through drier 23, conduit 24, thermal expansion valve 25 and conduit 27 into the inside 29 of shell evaporator 30 and it then passes around baffles 28 in traveling from inlet conduit 27 to outlet conduit 31. The shell evaporator 30 is a conventional device well known in the field, and it is schematically shown in FIGS. 1 and 3. Conduit 20, receiver 21, conduit 22, drier 23, conduit 24, and conduit 27 are to be collectively considered as the conduit between the compressor 19 and shell evaporator 30.

The refrigerant leaving conduit 29 of shell evaporator 30 passes into conduit 31, through heat exchange conduit 32 of control evaporator 15, conduit 33, suction line filter drier 34, conduit 35, suction line solenoid valve 37, conduit 39, suction accumulator 40, and conduit 41, into the inlet 42 of compressor 11. All of the above enumerated components between heat exchange conduit 29 and inlet 42, that is, components 31, 32, 33, 34, 35, 37, 39, 40 and 41 are to be considered collectively as the suction line of the system.

As noted briefly above, the present refrigeration system, by way of example and not of limitation, is used in conjunction with an air drier wherein refrigeration is utilized to remove moisture from air which has been compressed. Thus, wet compressed air from conduit 43 (FIGS. 1 and 3) is passed, in the direction of arrows 46, through heat exchange conduits 44 (FIG. 3) of air-to-air heat exchanger 45 and then is passed through conduit 47 leading to heat exchange conduits 49 of shell evaporator 30 where it flows in the direction of arrows 56. It then flows through conduit 50 to coalescer/separator 51 from which it passes into conduit 52 and then sinuously around baffles 53 of air-to-air heat exchanger 45 and then to conduit 54 wherein it is clean, dry, oil-free air. The air-to-air heat exchanger is a conventional device well known in the field, and it is schematically depicted in FIGS. 1 and 3.

As noted above, one aspect of the present invention is to cause shell evaporator 30 to function as a fully flooded evaporator so that a mixture of liquid refrigerant and oil will pass into the inlet 31a of conduit 31, which is located at the top of shell evaporator 30 (FIG. 3), as it must be to cause shell evaporator 30 to function as a fully flooded evaporator. Thus, a mixture of liquid refrigerant and oil will pass through conduit 31 to heat exchange conduit 32 of control evaporator 15. Within control evaporator 15, which functions as a supplemental evaporator, the liquid refrigerant in conduit 32 is vaporized because of the heat exchange relationship between conduit 32 and conduit 14 which conducts hot gaseous refrigerant through control evaporator 15. Thus, the refrigerant which passes into conduit 33 will be vaporized and thus will be superheated. This superheat will be sensed by bulb 55 which is coupled to thermal expansion valve 25 by conduit 57. Thus, the thermal expansion valve 25, by sensing superheat in suction line conduit portion 33, will open to cause more liquid refrigerant to enter shell evaporator 30 and thus cause it to be fully flooded so that a mixture of liquid refrigerant and oil will pass into shell evaporator outlet 31a.

The control evaporator 15, in conjunction with the thermal expansion valve 25 and its control 55, provides for liquid level control in the shell evaporator 30 to cause it to function as a fully flooded evaporator to thereby provide accurate superheat control and positive oil return to the compressor at all refrigeration loads from zero to heavy overload without the necessity of prior art surge drums, recirculating systems, floats, oil return piping, oil separators or any other components. It is because the shell evaporator 30 is caused to function in fully flooded condition that there is positive oil return through conduit 31 to the compressor because the oil has to be entrained with the liquid refrigerant in order to pass from the shell evaporator 30. In other words, if shell evaporator 30 was not fully flooded and refrigerant gas passed therefrom, the oil would not be entrained in such refrigerant gas so as to return to the compressor for proper lubrication. In addition to its function of causing the shell evaporator 30 to function in fully flooded condition, the control evaporator 15 also insures that the liquid refrigerant from conduit 31 is fully vaporized so that there is no liquid refrigerant passing into the inlet 42 of compressor 11, thereby insuring that there is no slugging or flood-back.

Figure 1A:
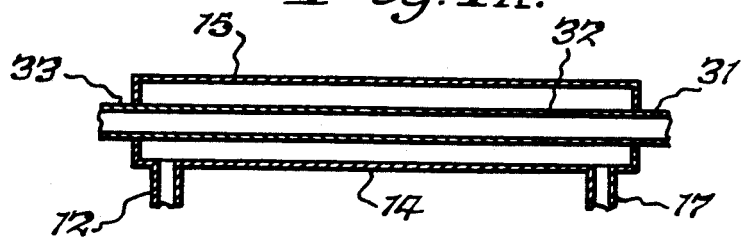
FIG. 1A is a fragmentary view of the suction line portion of the refrigeration system containing the control evaporator.

While control evaporator 15 has been depicted as utilizing hot refrigerant gas, it will be appreciated that the suction line portion 32 can be heated by any other suitable means, such as an electrical heating coil or any other suitable arrangement which will provide heat. The preferred structure of the control evaporator is shown in FIG. 1A wherein it comprises a tubular conduit which encircles suction conduit portion 32. Hot gas is provided to the tubular conduit from conduit 12 and leaves through conduit 17 (FIGS. 1 and 1A).

In accordance with another aspect of the present invention, compressor 11 is selectively unloaded when it is providing too much refrigeration, while permitting it to continue running without the risk of overheating, short cycling, oil pump-out, and while providing significant power savings over other systems, such as cycling the compressor.

The unloading system for hermetic compressor 11 includes a "hot loop" consisting of solenoid valve 60 which has its inlet in communication with high pressure conduit 12 through conduit 61 and which has its outlet in communication with suction line portion 39 through conduit 62. Thus, solenoid valve 60, when open, causes hot refrigerant to flow from the outlet of compressor 11 back to the inlet of the compressor. The unloading circuit also includes a "cold loop" circuit wherein solenoid valve 63 has its inlet in communication with high pressure conduit 12 through conduit 64 and has its outlet in communication with conduit 27 leading to the inlet of evaporator 30 through conduit 65. When solenoid valve 63 is open, hot refrigerant from the outlet of compressor 11 bypasses condenser 19 and is fed directly to evaporator 30 where it is cooled. In this respect, the outlet of conduit 65 can be coupled to any portion of the conduit leading to the evaporator provided it bypasses the condenser 19 and expansion valve 25 and this is considered the inlet of the evaporator. Preferably its outlet should be relatively close to the evaporator. If desired, the outlet of conduit 65 can be placed in communication with conduit 31, that is, any portion of conduit 31 between the evaporator and bulb 55 and preferably before heat exchanger 15, and this is considered the outlet of the evaporator. Also, if desired, conduit 65 can be placed in communication with both the inlet and outlet of the evaporator. Normally solenoid valves 60 and 63 are closed so that refrigerant does not pass through the conduits leading to and from them.

The compressor 11 is unloaded by energizing normally closed solenoid valves 60 and 63 to an open condition whenever the temperature of the wet air leaving conduit 49 of evaporator 30 falls below the controller setting. In this respect, if the water in this air should freeze, it will clog conduits 49. Accordingly, a control arrangement is provided to prevent this from happening while permitting compressor 11 to continue running. The control arrangement includes a thermocouple 67 (FIGS. 1, 3, 4 and 5) which is inserted into the outlet portion 48 of the conduit 49, as shown in FIG. 3. More specifically, thermocouple 71 is located in the portion 48 of conduit 49 carrying air leaving shell evaporator 30 so that it is exposed to the coolest air temperature leaving the shell evaporator. Thermocouple 67 is connected by lead 69 to dew point temperature controller 70 which opens solenoid valves 60 and 63 when it is actuated. Lead 69 is sealed to evaporator 30 by a suitable seal 68. Thermocouple 67 is housed within the central portion 71 of finned member 72 and is in tight heat-conducting contact therewith. The fins 73 have their outer edges in firm heat-conducting engagement with the inside of portion 48 of conduit 49 through which the cooled air leaving shell evaporator 30 passes. Thus, when there is a high air flow through the portion 48 of conduit 49, thermocouple 67 will essentially sense the temperature of the air, notwithstanding that portion 48 of conduit 49 is immersed in liquid refrigerant which fills shell evaporator 30. Alternatively, if there is a low air flow through outlet portion 48 of conduit 49, the thermocouple 67 will essentially sense the temperature of the liquid refrigerant in flooded shell evaporator 30 because this temperature is conducted through conduit 49 to thermocouple 67 by fins 73 and body portion 72 of finned member 71. In either event, the sensing of the temperature by thermocouple 67 will unload compressor 11 when the temperature at thermocouple 67 falls below a predetermined value. While a thermocouple has been shown, it will be appreciated that other types of temperature sensing devices, such as a fluid containing bulb, can be placed in central portion 71 and in tight heat-conducting relationship therewith.

Figure 2:
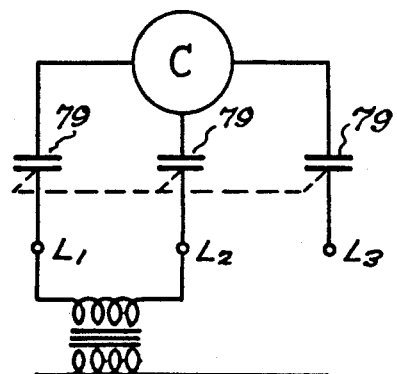
FIG. 2 is an abbreviated electrical schematic diagram for the system of FIG. 1 and showing especially the compressor unloading structure.
Figure 2:
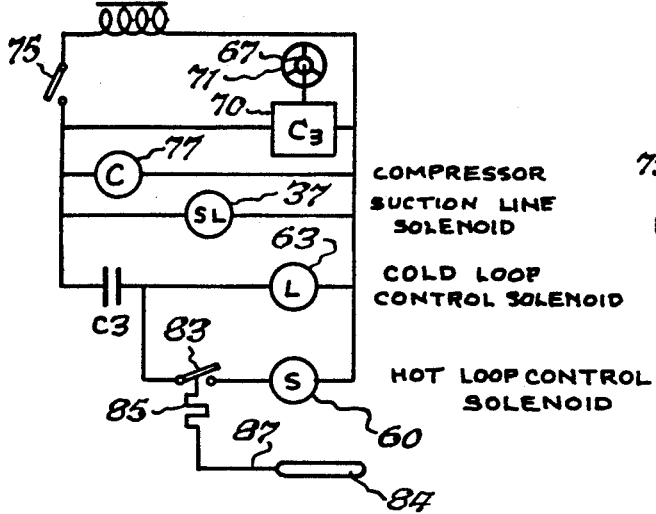

The unloading of compressor 11 is effected in the following manner. Normally, solenoid valves 60 and 63 are closed. When the system is placed in operation by closing switch 75 (FIG. 2), relay 77 is energized to close contacts 79 and thus actuate compressor 11. Also at this time suction line solenoid 37 is opened to maintain the suction line open as long as the compressor 11 is in operation. When the system is first started up, the temperature of air in conduit 49 will be above a predetermined value and solenoid valves 60 and 63 will remain closed, thus causing the refrigerant provided by compressor 11 to pass through the control evaporator 14, condenser 19, thermal expansion valve 25, flooded evaporator 30, and the suction lines back to the compressor. There will be no flow through the branches in which solenoid valves 60 and 63 are located. This condition will persist while the compressor 11 is loaded sufficiently so that the temperature sensed by thermocouple 67 remains above a predetermined value. However, if it should drop below that value, this means that it senses a temperature in portion 48 of conduit 49 which falls below the controller setting temperature. This in turn requires that compressor 11 be unloaded so that the system will cease to provide refrigeration, and this is accomplished by permitting compressor 11 to continue in operation. More specifically, when thermocouple 67 senses the temperature drop below a predetermined value, it will actuate dew point temperature controller 70, which in turn causes contacts C3 to close, thereby energizing solenoid valve 60 and solenoid valve 63 to thereby open both of these valves. Solenoid valve 60 can be energized because switch 83 is normally closed. When solenoid valve 60 is opened, hot gas from conduit 12 will pass into suction line portion 39 and back to the compressor, thereby causing unloading in this respect. However, this aspect of the unloading may cause the compressor to overheat because hot gaseous refrigerant is being passed back to it. In order to compensate for this, the opening of solenoid valve 63 will cause hot refrigerator gas to pass from conduit 12 to the inlet of shell evaporator 30 and thus pass through the shell evaporator, the control evaporator 15, and into portion 33 of the suction line. The gas thus passing from solenoid valve 63 through the shell evaporator will be cooled and this cooled gas will mingle in conduit 39 with the hot gas emanating from solenoid valve 60 of the hot loop and thus provide unloading without causing the compressor to overheat. At this point it is to be noted that there is a sensing bulb 84 (FIG. 1) on suction line portion 41, and it is in communication with thermostat 85 (FIGS. 1 and 2) through lead 87. Sensing bulb 84 contains fluid which changes volume in response to temperature changes, but other types of sensing means can be used. When this thermostat senses the suction line temperature in conduit 41 to be above a predetermined value, thermostat 85 will open switch 83 to thereby deenergize solenoid valve 60 and cause it to close, thereby causing the unloading to be effected only through the cold loop because at this time solenoid valve 63 remains open. When the temperature of the refrigerant in suction line portion 41 falls below a predetermined value, sensing bulb 84 will again cause thermostat 85 to close switch 83 to again cause solenoid valve 60 to open to thereby again place the hot loop in the circuit. Check valve 13 in line 12 prevents backflow of liquid refrigerant from condenser 19 and control evaporator 15 when solenoid valve 60 is open.

While the present application has referred to a halocarbon refrigeration system, it will be appreciated that it need not be restricted thereto, but the various aspects of the present disclosure may be used with refrigeration systems utilizing other types of refrigerants such as ammonia, carbon dioxide or other materials which can be transformed between gaeous and liquid phases.

It can thus be seen that the improved refrigeration system of the present invention is manifestly capable of achieving the above enumerated objects, and while preferred embodiments of the present invention have been disclosed, it will be appreciated that it is not limited thereto but may be otherwise embodied within the scope of the following claims.

What is claimed is:

1. In a fluid passing conduit having an internal surface through which fluid passes and having an external surface subject to the temperature of a cooling medium in which the fluid passing conduit is located, a temperature sensing control comprising a finned tube having a central tubular portion, fin means extending outwardly from said central tubular portion, outer edge means on said fin means in firm heat conducting contact with said internal surface, and a control member located within said central tubular portion and in firm heat conducting contact therewith to thereby substantially sense the temperature of said fluid passing through said fluid passing conduit when said flow dominates the effect of said cooling medium to which the external surface of said fluid passing conduit is subjected and to substantially sense the temperature of said medium when the latter dominates the temperature of said fluid passing through said fluid passing conduit.

2. In a fluid passing conduit as set forth in claim 1 wherein said control member comprises a sensing bulb.

* * * * *